(12) United States Patent
Kakimoto et al.

(10) Patent No.: US 6,626,413 B1
(45) Date of Patent: Sep. 30, 2003

(54) EXHAUST PIPE SUPPORTING DEVICE (75) Inventors: Toshihiro Kakimoto, Osaka (JP); Naoki Yamaguchi, Osaka (JP)

(73) Assignee: Toyo Tire & Rubber Co., Ltd., Osaka (JP)

( * ) Notice: Subject to any disclaimer, the term of this patent is extended or adjusted under 35 U.S.C. 154(b) by 0 days.

(21) Appl. No.: 10/162,788

(22) Filed: Jun. 5, 2002

(30) Foreign Application Priority Data

Mar. 12, 2002 (JP) ......................................... 2002-067612

(51) Int. Cl.[7] ................................................ F16M 13/00
(52) U.S. Cl. .......................................... 248/610; 248/58
(58) Field of Search .................................. 248/610, 611, 248/612, 613, 614, 58, 62, 65; 267/141

(56) References Cited

U.S. PATENT DOCUMENTS

| | | | | |
|---|---|---|---|---|
| 4,660,797 A | * | 4/1987 | Tonnies | 248/610 |
| 5,050,837 A | | 9/1991 | Hamada et al. | 248/610 |
| 5,085,252 A | * | 2/1992 | Mohamed et al. | 139/22 |
| 5,271,595 A | * | 12/1993 | Simon et al. | 248/632 |
| 5,829,732 A | | 11/1998 | Yamaguchi et al. | 248/610 |
| 6,070,849 A | * | 6/2000 | Larmande et al. | 248/610 |
| 6,402,119 B1 | * | 6/2002 | Miska | 248/613 |
| 6,454,236 B2 | * | 9/2002 | Garaud et al. | 248/635 |

FOREIGN PATENT DOCUMENTS

| | | | | |
|---|---|---|---|---|
| JP | 2-146328 A | * | 6/1990 | ................. 267/140 |
| JP | 03066953 | | 3/1991 | |
| JP | 09264381 | | 10/1997 | |
| JP | 2001-50346 A | * | 2/2001 | |

* cited by examiner

Primary Examiner—Ramon O. Ramirez
(74) Attorney, Agent, or Firm—Jordan and Hamburg LLP (57) ABSTRACT An exhaust pipe supporting device, with which the absolute spring rate in a special frequency range can be reduced, comprises a first holding portion 2, a second holding portion 3, a pair of side wall portions 4, 4 connecting on both sides of both holding portions and a central vibration damping portion 6 interposed at an intermediate position between the first and second holding portions 2, 3, wherein the central vibration damping portion 6 comprises a mass portion 61 and a pair of connecting portions 62, 62 which connect two sides of the mass portion 61 to the side wall portions 4, the mass portion 61 is formed to have larger mass than that of the connecting portions 62, and the connecting portions 62 may be provided with concave portions 64 depressed in the longitudinal direction on the connecting portion 62, the size T1 of the connecting portion 62 in the longitudinal direction thus being set smaller than the size T2 of the side wall portion 4 in the longitudinal direction.

3 Claims, 6 Drawing Sheets

EXHAUST PIPE SUPPORTING DEVICE

BACKGROUND OF THE INVENTION

1. Field of the Invention

This invention relates to a muffler hanger of an automobile, that is, an exhaust pipe supporting device to support an exhaust pipe by a vehicle body in a vibration-proof manner.

2. Description of Related Art

Heretofore, a supporting device integrally molded to an exhaust pipe consisting of a rubber elastomer to support an exhaust pipe to a vehicle body in a vibration-proof manner has been known, in which a first holding portion having a through-hole in which a supporting member extending from the vehicle body is inserted, and a second holding portion having a through-hole in which a supporting member extending from the exhaust pipe side is inserted, are connected by two right and left arch-shaped side wall portions so as to make both through-holes be in parallel and also oppose each other across a vertical gap, the shape of the supporting device being generally annular.

Although this supporting device elastomer absorbs vibration, right and left side wall portions are prone to vibrating due to shaking by the vehicle body or the exhaust pipe, and dynamic absolute spring rate rises in the high frequency region (for example, a region of 500 Hz or more). Since one cannot expect adequate vibration transmission suppression, it has been suggested to connect right and left both side wall portions by disposing a center connecting portion at intermediate position between the first and second holding portions (JP-A-66953/1991).

With regard to the suggestion described above that both side wall portions are simply connected by the center connecting portion, there may be the cases where adequate effect of vibration transmission suppression cannot be accomplished, for example, in a range of 300 to 400 Hz or thereabout bandwidth, due to discrepancy of frequency characteristics when atmospheric temperature rises. Accordingly, in order to improve upon this, an applicant suggests a supporting device provided with a center vibration damping portion, in which, instead of the center connecting portion described above, there is a center portion, that is, a mass portion, the mass of which is greater than that at both side portions, and both side portions split midway into two and are connected respectively with the right and left side wall portions (JP-A-264381/1997).

As described above, the supporting device, in which the right and left side wall portions are connected at the center vibration damping portion having the mass portion at the center portion, has normally three vibration modes, or absolute spring rate peaks; for example, a first mode at close to 250 Hz, a second mode at close to 500 Hz, and a third mode at close to 1000 Hz.

These three vibration modes are caused by the following vibrations, respectively, according to analysis of the present inventors. The first mode is ascribed to vibrational resonance induced with so-called "mass-spring system" vibration as its major factor: the mass portion vibrates vertically, with the mass portion at the center vibration damping portion taken as "mass" and right and left connecting portions which support the mass portion on both sides thereof taken as "springs". The second mode is ascribed to vibrational resonance of flexural vibration of the mass portion (flexural vibration of the mass portion is considered as a "beam" with front and rear ends thereof being free to move) with vertical vibration of both sidewall portions which together form a ring. The third mode is ascribed to resonance of respective vibrations of the two side wall portions which together form a ring.

Incidentally, there are the cases where in loading the exhaust pipe supporting device it may be required to make absolute spring rate small in a specific frequency range for a specific vehicle. In that case, when there exists one of the vibration modes described above in this specific frequency range, it is difficult to satisfy this requirement adequately only by lowering the peak value of the absolute spring rate in the vibration mode. Accordingly, it is desirable to reduce the absolute spring rate in the specific frequency range by shifting the resonance frequency of the vibration mode away from the specific frequency range.

SUMMARY OF THE INVENTION

In view of the aforementioned problems and difficulties, the present invention has an object to provide an exhaust pipe supporting device having a center vibration damping portion which can shift the resonance frequency in the vibration mode to a lower frequency and thereby reduce the absolute spring rate in a special frequency range.

An exhaust pipe supporting device of the present invention is integrally molded with the exhaust pipe, consists of a rubber elastomer, and has a first holding portion having a through-hole in which a supporting member extending from the vehicle body side is inserted, a second holding portion having a through-hole in which a supporting member extending from the exhaust pipe is inserted, a pair of side wall portions which connect on both the first holding portion and the second holding portion disposed at intervals, and a center vibration damping portion interposed at an intermediate position between the first and the second holding portions and connected to both side wall portions, wherein the center vibration damping portion comprises a center portion formed as a mass portion and a pair of connecting portions which connect both sides of the mass portion to the side wall portions, the mass portion is formed to have larger mass than that of the connecting portion, the width (T1) of the connecting portion in the longitudinal direction of the supporting device is set smaller than the length (T2) of the side wall portion in the longitudinal direction of the supporting device. Now, the longitudinal direction of the supporting device is the longitudinal direction of the device, normally the axial direction of the through-holes.

In reference to the supporting device of the invention, in order to set the size (T1) of the connecting portion smaller than the size (T2) of the side wall portion, the center vibration damping portion may be provided with a concave portion depressed in the longitudinal direction at the connecting portion relative to the side wall portion and the mass portion on both sides thereof.

In this case, the concave portion may be provided on either the front or the back side or on both sides in the longitudinal direction of each of the connecting portions on both sides of the mass portion. In the former case, furthermore, on the connecting portions on both sides of the mass portion, the concave portions may be provided both on the front, both on the back, or one each.

In reference to the supporting device of the invention, it is preferable that the width (T1) of the connecting portion is set to 20 to 90% of the length (T2) of the side wall portion.

In reference to the supporting device of the invention, the size (T3) of the mass portion in the longitudinal direction may be set larger than the length (T2) of the side wall portion, and thereby the mass of the mass portion can be increased to realize superior vibration-damping function.

DESCRIPTION OF THE PREFERRED EMBODIMENTS

The embodiments of an exhaust pipe supporting device of the invention will be hereinafter described with reference to the accompanying drawings.

Figure 1:
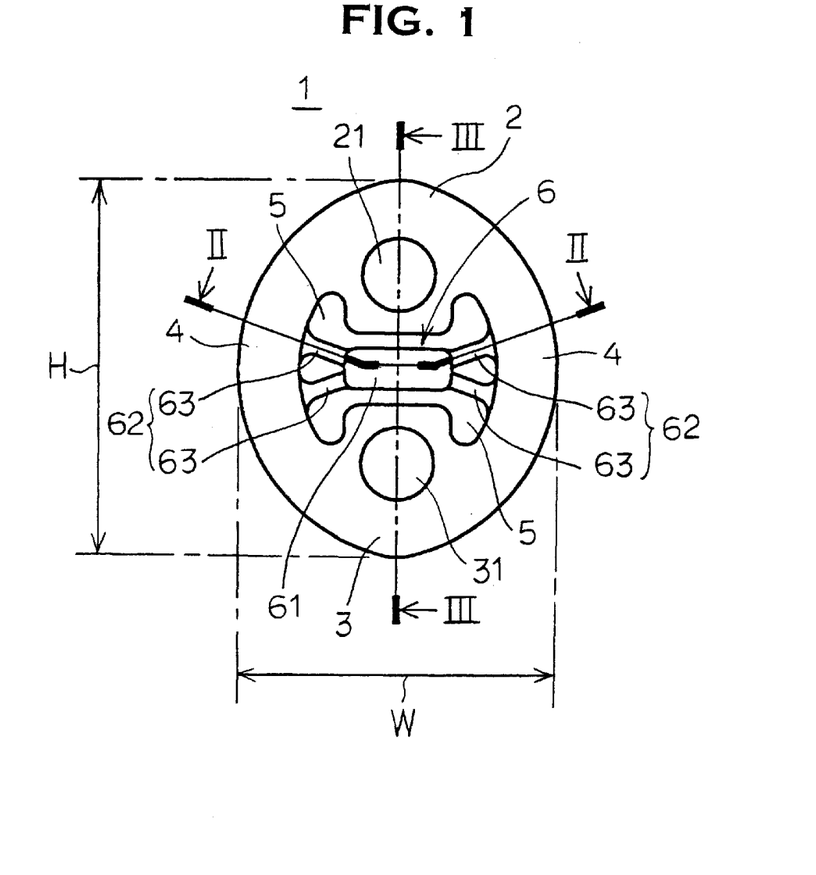
FIG. 1 is an front view of an exhaust pipe supporting device of a first embodiment of the invention.
Figure 2:
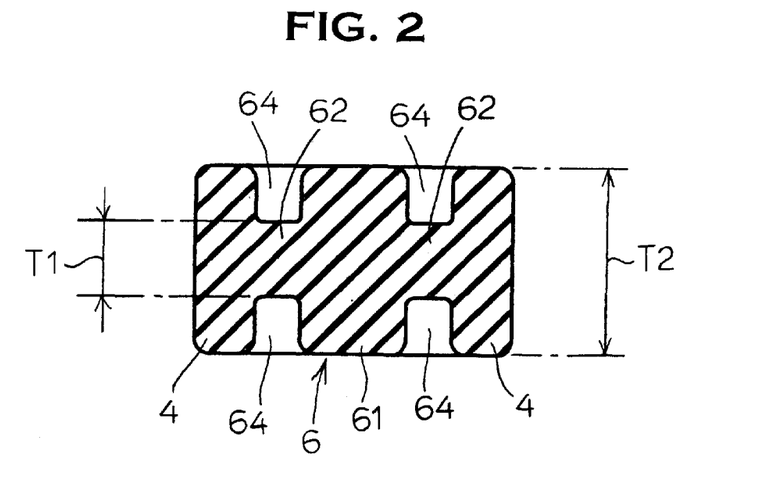
FIG. 2 is a sectional view taken on line II—II of FIG. 1.
Figure 3:
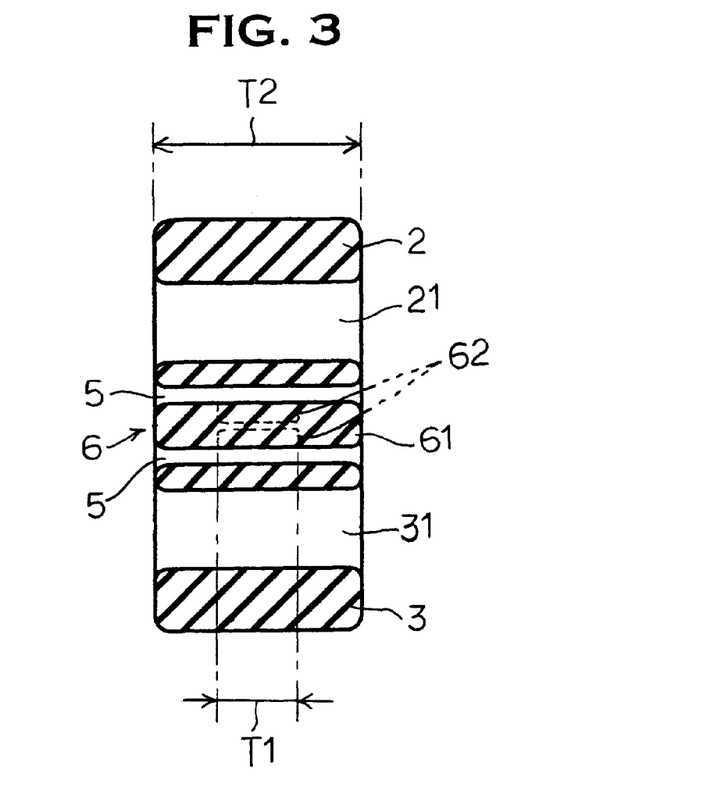
FIG. 3 is a sectional view taken on line III—III of FIG. 1.

FIGS. 1 to 3 shows an exhaust pipe supporting device (1) of a first embodiment. As shown here, the supporting device (1) as a whole assumes a nearly elliptic thick plate form, with the major axis being in the vertical direction and the minor axis in the other transverse direction, and it is integrally molded in the form of a ring as viewed from the front by vulcanization forming an elastomer, that is, a rubber material. Basic configuration of the body portion is described below.

The supporting device (1) has, on the top, a first holding portion (2) having a through-hole (21) in the longitudinal direction in which a support member extending from the vehicle body is inserted, and, on the bottom opposite to the first holding portion (2) at the interval required, a second holding portion (3) having a through-hole (31) in the longitudinal direction in which a support member extending from the exhaust pipe is inserted. These first and second holding portions (2), (3) are connected by a pair of right and left side wall portions (4), (4) in the form of arches, both ends of which are connected to the right and left sides of the holding portions, respectively, thereby forming vertically and transversely symmetrical ring of nearly elliptic form as a whole.

Further, both side wall portions (4), (4) are disposed at an intermediate position between the first and second holding portions (2), (3) so as to keep gaps (5), (5) between both holding portions (2), (3), these gaps linked by the central vibration damping portion (6) which is connected at two of its ends to the inner surface of both side wall portions (4), (4).

The central vibration damping portion (6) comprises a center pillar portion connected as a mass portion (61), a pair of right and left connecting portions (62), (62) which support the mass portion (61) on both sides and connect to both side wall portions (4), (4). The mass portion (61) is formed to have larger mass than the connecting portions (62), (62). The connecting portions (62), (62) split into two away from the mass portion (61) according to the first embodiment. The diverging portions (63) (63), (63) (63) are connected to the corresponding side wall portions (4), (4), respectively.

As shown in FIG. 2, the central vibration damping portion (6) is depressed in the direction of device's thickness (longitudinally, that is, in parallel to axial direction of through-hole (21), (31)) at its connecting portions (62) as compared to the sidewall portion (4) and the mass portion (61). That is, the central vibration damping portion (6) has concave openings (64) (64) (64) (64) at the connecting portions (62) (62) on both sides of the mass portion (61) as shown in a sectional view of FIG. 2. And, by providing such concave portions (64), the size (T1) of the connecting portions (62) in the longitudinal direction is made smaller than the size (T2) of the sidewall portion (4) in the longitudinal direction. It is preferable that the size (T1) of the connecting portion (62) is set to 20 to 90% of the size (T2) of the side wall portion (4) and more preferably to 30 to 60% of T2.

Figure 4:
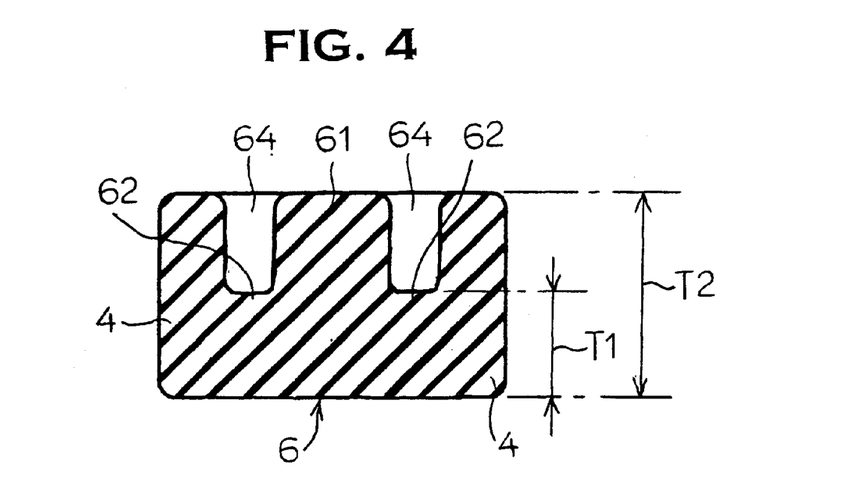
FIG. 4 is a sectional view of an example of modified central vibration damping portion (section corresponding to the line II—II of FIG. 1).
Figure 5:
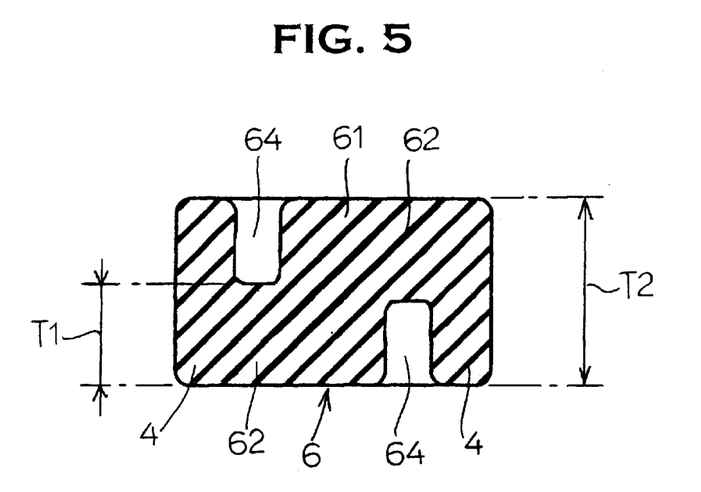
FIG. 5 is a sectional view of another example of modified central vibration damping portion (section corresponding to the line II—II of FIG. 1).

In this embodiment, as shown in FIG. 2, the concave portion (64) is provided on both the front and the back side in the longitudinal direction at the connecting portions (62) (62) on both right and left sides of the mass portion (61). As shown in FIGS. 4, 5, the concave portion (64) may only be provided either on the front or the back side in the longitudinal direction at the connecting portions (62) (62) on the right and left sides of the mass portion (61). In detail, in an example as shown in FIG. 4, the concave portions (64) (64) are provided on the same side, the front or the back at the connecting portions (62) (62) on the right and left sides of the mass portion (61). Furthermore, in an example shown in FIG. 5, the concave portions (64) (64) are provided alternately on the face and back sides at the connecting portions (62) (62) on the right and left sides of the mass portion (61).

Figure 6:
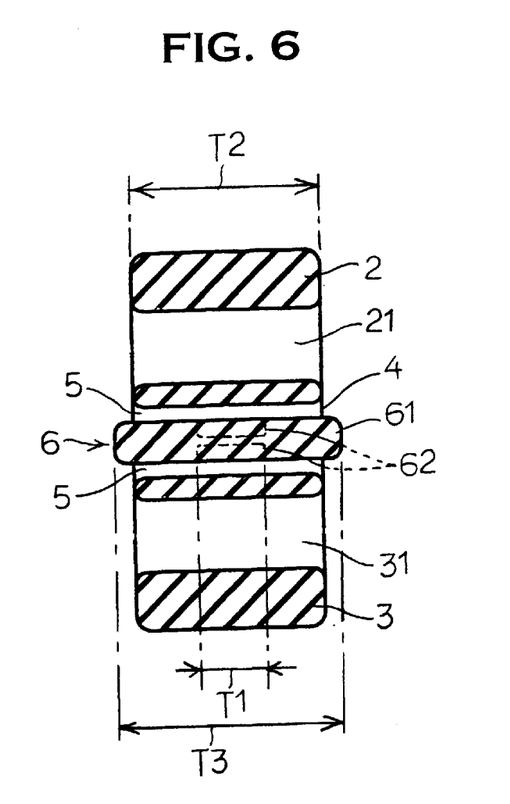
FIG. 6 is a sectional view of further example of modified central vibration damping portion (section corresponding to the line III—III of FIG. 1).

In this embodiment, as shown in FIGS. 2, 3, the size of the mass portion (61) in the longitudinal direction is set to the same value as the size (T2) of the side wall portion (4), and the size of the first and second holding portions (2) (3) in the longitudinal direction is also set to the same value of the size (T2) of the side wall portion (4). Therefore, with regard to the supporting device (1), the size in the longitudinal direction is the same everywhere other than the connecting portions (62), and the surfaces in the longitudinal direction are formed flat other than at the connecting portions (62). In reference to the mass portion (61), as shown in FIG. 6, the size (T3) in the longitudinal direction may be set larger than the size (T2) of the side wall portion (4), thereby also capable of increasing the mass of the mass portion (61) and developing fully the vibration damping function.

Figure 7:
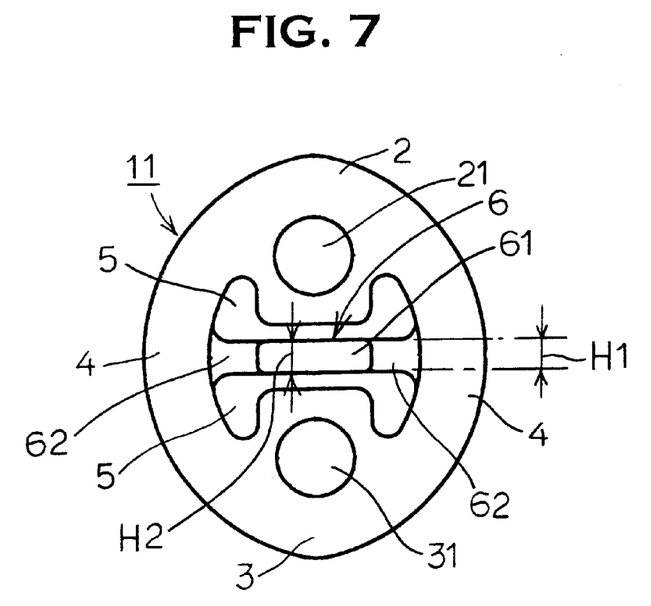
FIG. 7 is a front view of an exhaust pipe supporting device of a second embodiment of the invention.

FIG. 7 shows the exhaust pipe supporting device (11) according to the second embodiment of the invention. In this embodiment, right and left connecting portions (62) (62) on the central vibration damping portion (6) are configured by a single portion, respectively, without splitting into two as in the first embodiment, and therefore the central vibration damping portion (6) connects in straight lines between the right and left side wall portions (4) (4). Furthermore, the size (H1) in the vertical direction of the connecting portion (62) is set to the same size as the size (H2) in the vertical direction of the mass portion (61).

In the second embodiment as in the first one, with regard to the right and left connecting portions (62) (62) on the central vibration damping portion (6), the size (T1) in the longitudinal direction is set smaller than the size (T2) of the side wall portion (4).

Figure 8:
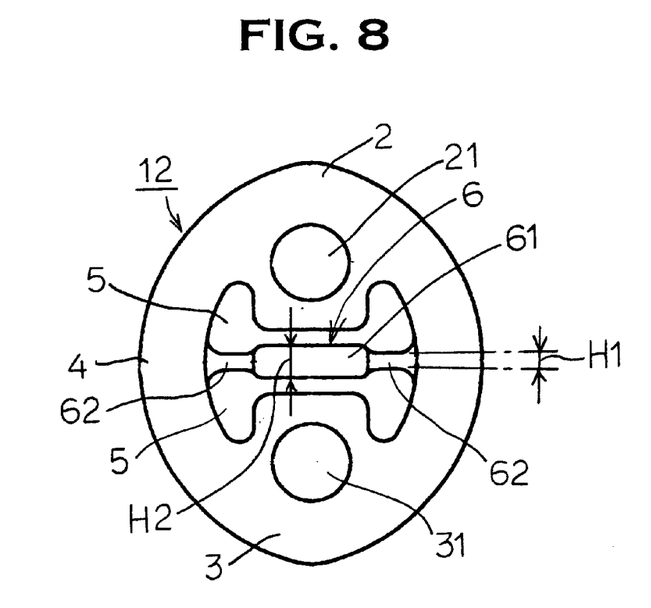
FIG. 8 is a front view of an exhaust pipe supporting device of a third embodiment of the invention.

FIG. 8 shows the exhaust pipe supporting device (12) according to the third embodiment of the invention. In this embodiment, the connecting portions (62) (62) at the central vibration damping portion (6) are as in the second embodiment configured without splitting into two, and the size (T1) of the connecting portion (62) is set smaller than the size (T2) of the side wall portion (4). However, in the third embodiment, the size (H1) in the vertical direction of the connecting portion (62) is set smaller than the size (H2) in the vertical direction of the mass portion (61), thereby further reducing the spring rate of the connecting portion (62).

The supporting devices configured according to individual embodiments as described above serve to support the exhaust pipe by inserting and fixing the support member extending from the vehicle body into the through-hole (21) of the first holding portion (2) on the upper side and also by inserting and fixing the support member on the exhaust pipe side into the through-hole (31) of the second holding portion (3) on the lower side. Under this operating condition, vibration transmitted from the exhaust pipe side or from the vehicle body side due to engine running is absorbed to prevent noise and vibration inside the vehicle.

In reference to the supporting devices according to individual embodiments described above, by reducing the size (T1) in the longitudinal direction of the connecting portion (62) which supports the mass portion (61) of the central vibration damping portion (6), resonance frequency of the first mode ascribed to vertical vibration of the mass portion (61) can be shifted to lower frequency and the peak value itself of the absolute spring rate in the first mode can also be reduced. This is for the following reasons.

Figure 9:
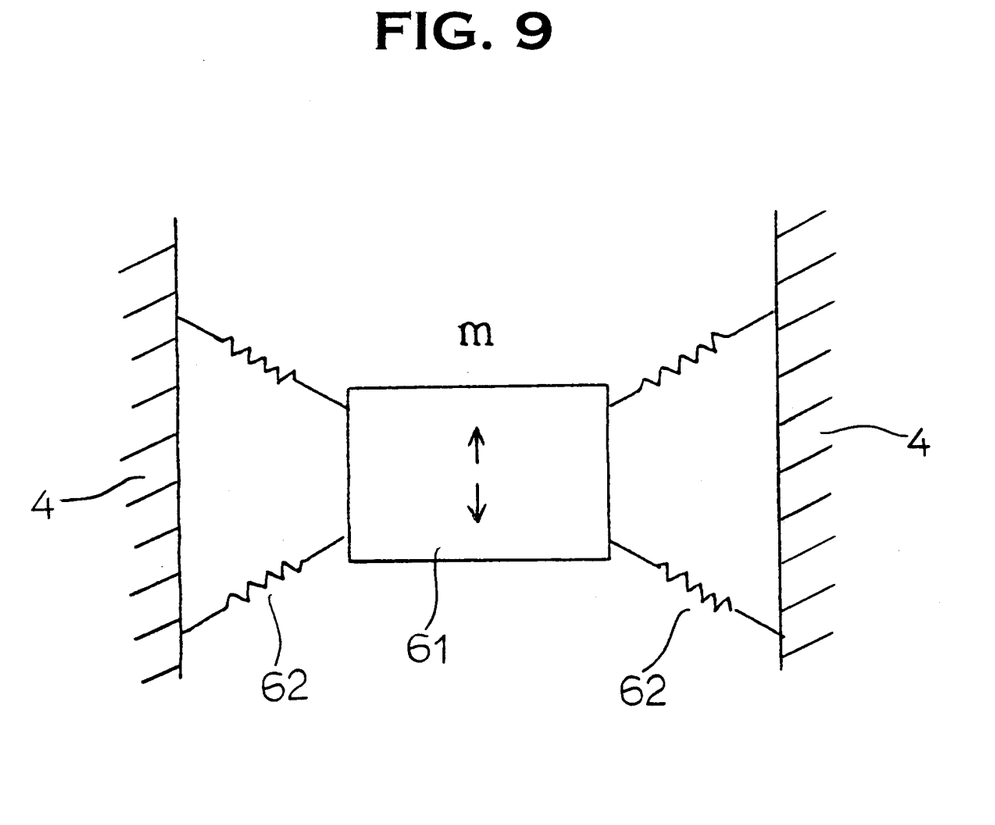
FIG. 9 is a schematic view showing a mass-spring system model.

As described above, in reference to the supporting device which connects right and left side wall portions to the central vibration damping portion, the first vibration mode signifies resonance with vertical vibration of the mass portion (61) at the central vibration damping portion (6) taken as main factor: this vibration is considered to be close to "mass-spring system" vibration with the mass portion (61) taken as "mass" and connecting portions on both sides thereof as "spring". For example, in case of the first embodiment supporting device (1), its vibration is represented by a one-degree-of-freedom mass-spring system model. With regard to the mass-spring system model, when the static spring rate in the vertical direction of the spring supporting the mass becomes smaller, resonance frequency becomes smaller accordingly.

In each embodiment described above, the spring rate of the connecting portion (62) becomes smaller when the size (T1) of the connecting portion (62) in the longitudinal direction is made small. Consequently, the resonant frequency is considered to become smaller, that is, being shifted to lower frequency. Besides, it is also considered that the peak value itself of the absolute spring rate in the first mode is reduced when the spring rate of the connecting portion (62) becomes smaller.

Here, a test was made to confirm this. A supporting device of the first embodiment described above was taken as an example and the size (T1) of the connecting portion (62) was made equal to the size (T2) of the side wall portion (4) on the supporting device and the same configuration is used for the rest in the comparative example, for the test. With regard to the supporting devices as cited in the embodiments and the comparative example, frequency and dynamic absolute spring rate are measured, and comparison is made between them.

In the example of the supporting device, overall length (H) in the vertical direction (major axis) was 50 mm, overall length (W) in the transverse horizontal direction (the minor axis) was 42 mm, the size T1 was 10 mm, T2 was 25 mm, and rubber hardness of the material (according to the measuring method stipulated by the rubber hardness testing method of the Japanese Industrial Standards (JIS A)) was 53 degrees.

The dynamic absolute spring rate is measured using a dynamic characteristic determination testing machine (KC-V type) made by Saginomiya Seisakusho, Inc.: when with the exhaust pipe supporting device being fixed to a jig of the dynamic characteristic testing machine by means of a bar-shaped metal support piece inserted into first and a second holding portions of the supporting device, a given load (50N) statically applied, a given vibration (constant 0.03 mm) applied by a vibration generator, sweeping from 100 Hz to 800 Hz is measuring dynamic load/displacement (deflection) and its phase angle and then calculating absolute spring rate according to a given operation method.

Figure 10:
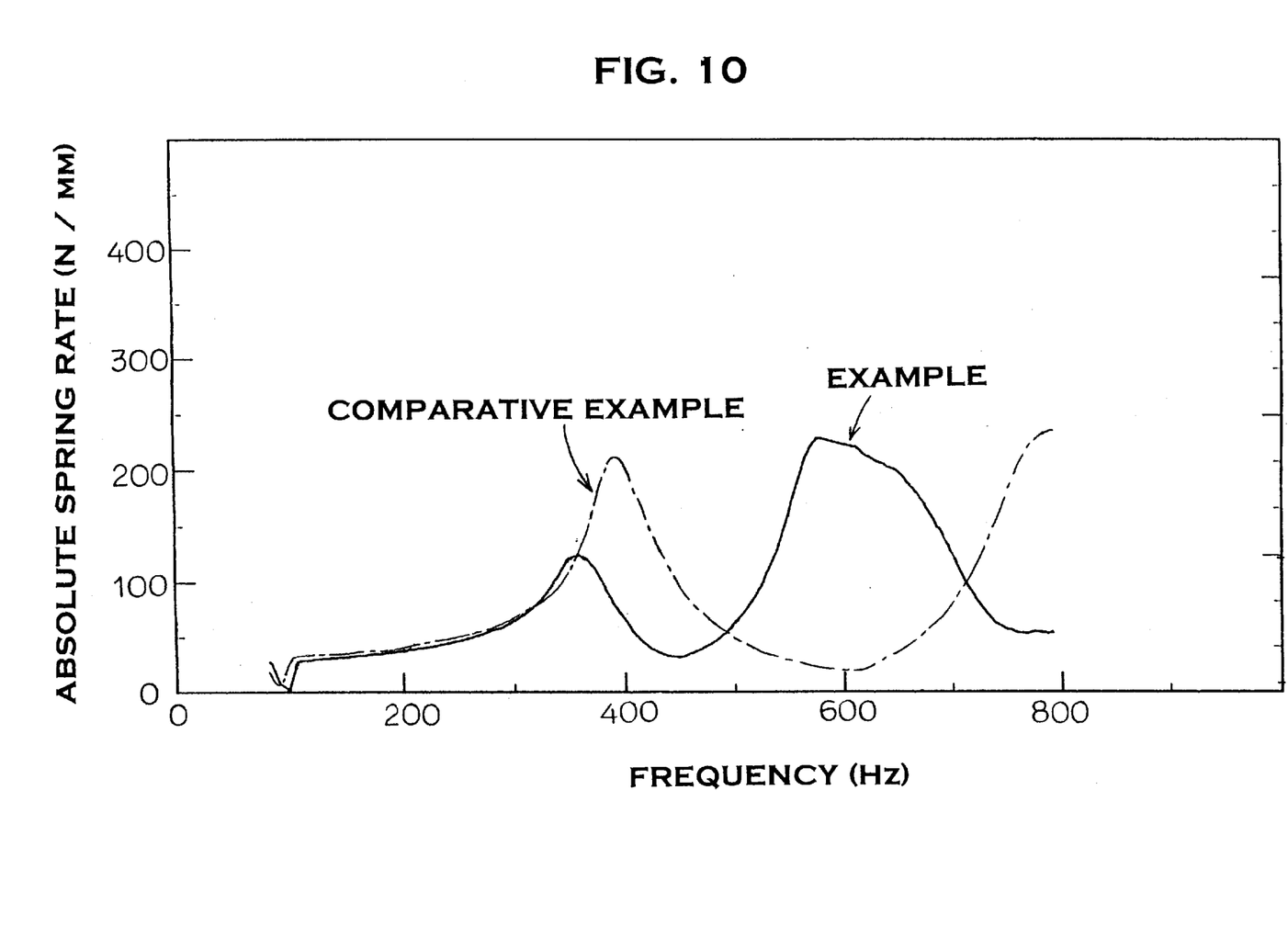
FIG. 10 is a graph showing the relation between frequency and dynamic absolute spring rate.

As clearly indicated in FIG. 10, the comparative example has a peak of absolute spring rate at close to frequency 400 Hz, so the absolute spring rate is close to 450 Hz, the special frequency of the loaded vehicle. On the contrary, in reference to the supporting device of the example, when the size (T1) at the connecting portion (62) described above is made smaller by a given amount, a peak of the absolute spring rate is lowered up to about 360 Hz, there exists the bottom of absolute spring rate at close to 450 Hz. This peak value of the absolute spring rate close to 360 Hz is reduced greatly as compared with the comparative example. Thus, the absolute spring rate of 450 Hz can be reduced greatly, allowing the requirements of the loading vehicle to be satisfied.

As aforementioned, according to the exhaust pipe supporting device of the invention, by reducing the size in the longitudinal direction of the device of the connecting portion which supports the mass portion at the central vibration damping portion, resonant frequency in the first mode ascribed to vertical vibration at the mass portion is shifted to a low frequency. Accordingly, the resonant frequency in the first mode can be separated from the special frequency range of the loading vehicle to reduce the absolute spring rate in the special frequency range. Furthermore, since the spring rate of the connecting portion becomes smaller when the size of the connecting portion is reduced, the peak value itself of the absolute spring rate in the first mode can also be reduced. Hence, the present invention provides superior vibration transmission suppression effect by meeting the characteristics required by the loading vehicle.

What is claimed is:

1. An exhaust pipe supporting device integrally molded with the exhaust pipe, consisting of a rubber elastomer and including:
    a first holding portion having a through-hole, in which a supporting member extending from the vehicle body is inserted,
    a second holding portion having a through-hole in which a supporting member extending from the exhaust pipe is inserted,
    a pair of side wall portions which connect on both sides of the first holding portion and the second holding portion at intervals, and
    a center vibration damping portion interposed at an intermediate position between the first and second holding portions and connected to the two side wall portion, wherein:

the center vibration damping portion comprises a center portion formed as a mass portion and a pair of connecting portions which connect the mass portion on both its sides to the side wall portions, the mass portion is formed to have larger mass than that of the connecting portion, the size (T1) of the connecting portion in the longitudinal direction of the supporting device is set smaller than the thickness (T2) of the side wall portion in the same direction, and the center vibration damping portion is provided with a concave portion depressed in the longitudinal direction on the connecting portion and facing the side wall portion and the mass portion on both sides thereof, whereby the size (T1) of the connecting portion is set smaller than the size (T2) of the side wall portion.

2. The exhaust pipe supporting device as set forth in claim 1, wherein the concave portion on the connecting portions on both sides of the mass portion is provided only on either the front or the back side in the longitudinal direction.

3. The exhaust pipe supporting device as set forth in claim 1, wherein on the connecting portions on both sides of the mass portion concave portions are provided on both the front and the back sides in the longitudinal direction.

* * * * *